Sept. 16, 1958
C. VAN DER LELY ET AL
RESILIENT RAKE WHEEL FOR SIDE
DELIVERY RAKES AND THE LIKE
Filed Aug. 26, 1953
2,851,846
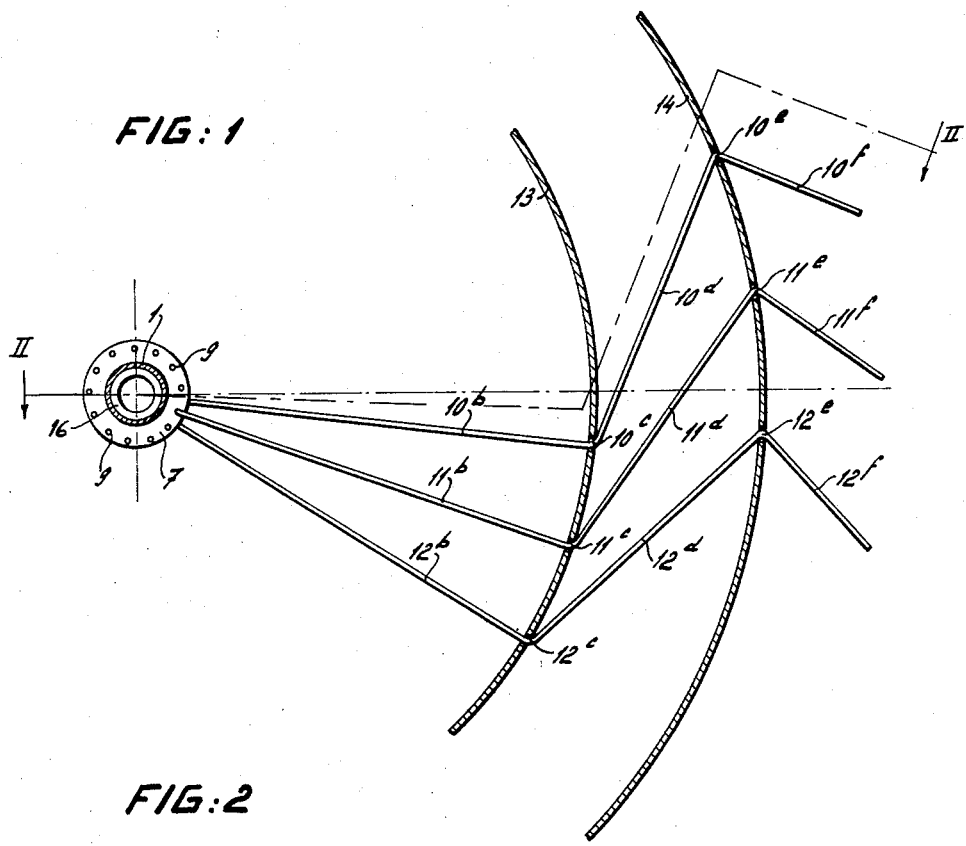
FIG:1
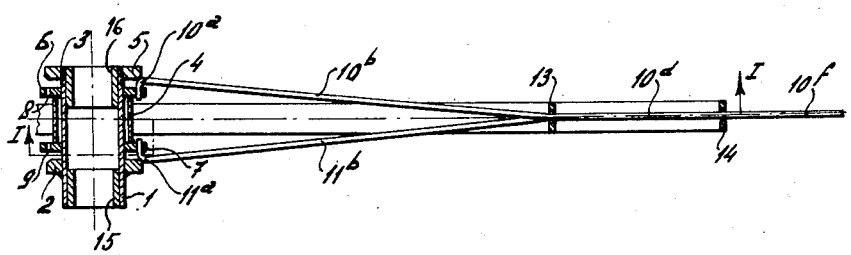
FIG:2

United States Patent Office 2,851,846
Patented Sept. 16, 1958

2,851,846

RESILIENT RAKE WHEEL FOR SIDE DELIVERY RAKES AND THE LIKE

Cornelis van der Lely and Ary van der Lely, Maasland, Netherlands, assignors to C. van der Lely N. V., Maasland, Netherlands, a Dutch limited company Application August 26, 1953, Serial No. 376,694

Claims priority, application Netherlands September 26, 1952

22 Claims. (Cl. 56—377)

This invention relates to a rake wheel for side delivery rakes, swath turners or similar raking devices, and more specifically to a rake wheel provided with a plurality of resilient circumferentially spaced teeth, each of which forms an appreciable angle with the radial plane passing through its inner end or foot and the wheel axis, the inner ends or feet of the teeth being interconnected by means of a rim adapted to be displaced considerably with regard to the wheel hub, each of the teeth being rotatable, under the influence of a lateral force, about an axis which is substantially defined by the foot of the tooth and a supporting point which is substantially rigidly connected to the wheel hub.

In the existing rake wheels of the above mentioned kind the supporting point is located near the wheel hub and is connected to the foot of the tooth by a spoke which extends substantially in the radial direction and constitutes the extension of the tooth. Although a rake wheel of this construction has a very good resiliency, it has the drawback that upon lateral deflection of a tooth the distance of the point of the tooth to the wheel hub increases or at most remains equal. In consequence thereof the number of teeth points being simultaneously in contact with the ground will be reduced to a minimum and, therefore, the working width of the wheel will be decreased.

It is an object of the present invention to obviate the above mentioned drawback and to provide a resilient rake wheel in which the distance of the tooth point to the wheel hub is reduced upon lateral deflection of the tooth, so as to increase the working width of the rake wheel. When making use of a number of overlapping rake wheels, this may lead to such an increase of the distance between their center lines that for a given total working width a smaller number of wheels may be sufficient.

According to the invention the above object is attained by locating the supporting point and the tooth on the same side of the plane passing through the wheel axis and the foot of the tooth, said supporting point being spaced at an appreciable distance from said plane.

Another object of the invention is to connect said supporting point to the foot of the tooth by a spoke constituting an extension of the tooth, so as to obtain the advantage that the angle between the tooth and the spoke may be less obtuse, in consequence of which upon deflection of the tooth the spoke will be subjected more to torsional stress and less to bending stress.

A further object of the invention is to arrange the tooth at right angles to the spoke in question, in which case upon lateral deflection of the tooth the spoke will be subjected merely to torsional and not to bending stress.

A still further object of the invention is to obtain an utmost supple resiliency or flexibility of the whole wheel by interconnecting the supporting points of the several teeth by means of a second rim or inner rim and connecting each of said points to the wheel hub by a spoke which extends substantially in radial direction and which is integral with the spoke running towards the foot of the tooth. In this instance the outer rim interconnecting the feet of the teeth may be resiliently displaced out of the wheel plane by twisting the radial spokes, whereby the spoke parts running towards the feet of the teeth will serve as cranks.

Further objects, features, details and advantages of the invention will become evident from the following description with reference to the accompanying drawing in which a favorable embodiment of the rake wheel has been shown diagrammatically and in which:

Fig. 1 is a sectional view of a rake wheel embodying this invention and taken along the line I—I of Fig. 2; and Fig. 2 is a sectional view of the rake wheel taken along the line II—II of Fig. 1.

In the drawing the hub of the rake wheel comprises a bushing 1 provided with linings 15 and 16 and constituting a bearing for the axle carrying the rake wheel. Said bushing carries at one end a fixed collar 2 and at the other end a screw thread 3. Another bushing 4 is arranged around the bushing 1. A collar 5 of the same shape as the collar 2 is screwed upon the screw thread 3, after the bushing 4 has been placed over the threaded end on bushing 1 in order to lock the bushing 4 in place, after which the collar 5 is secured against rotation.

The outer bushing 4 carries a collar at each of its ends. Each of said collars 6 and 7 is provided with a series of openings 8 and 9, respectively, the center lines of which are parallel to the center line of the hub.

In Fig. 1 only three spokes 10, 11 and 12 have been shown. The spoke 10 comprises a hook shaped extremity 10a (Fig. 2) introduced into one of the openings 8 of the collar 6, a part 10b extending radially towards an inner rim 13, a part 10d located between said inner rim 13 and an outer rim 14, and the tooth 10f. At the transition between the parts 10b and 10d the spoke passes through a hole in the inner rim 13, which defines a supporting point 10c for the spoke 10. At the foot or inner end 10e of the tooth 10f the spoke passes through a hole in the outer rim 14. The tooth 10f is substantially at right angles to the spoke portion 10d, said spoke portion 10d being nearly tangent to the inner rim 13. The parts of the spokes 11 and 12 have been designated in the drawing in a similar manner as those of the spoke 10.

The holes in the rims 13 and 14 are equally distributed along the circumference of these rims and the parts of the various spokes extending outwardly beyond the rim 13 are of the same shape. The parts of said spokes located inside the rim 13 are different from each other only insofar as they are connected alternately to the collar 6 and to the collar 7. For instance the spokes 10 and 12 run towards the collar 6, whereas the spoke 11 runs towards the collar 7. Consequently the spoke ends 10a and 12a are introduced into openings 8, whereas the spoke end 11a is introduced into an opening 9.

Due to the spreaded arrangement of the spoke ends, the inner rim 13 cannot be moved out of its plane without causing lengthening of the parts between the hub and the inner rim, such as the part 10b, said lengthening being opposed by the bends in the spoke near said rim, such as 10c. In this direction the rim 13 is, therefore, very rigidly secured. A rotation of the rim 13 in its plane is possible, but this will cause bending of all spoke parts 10b and 10d, 11b and 11d, etc., so that there is also a great resistance against such rotation.

As distinct from the inner rim 13, the outer rim 14 is adapted to deflect readily out of its plane. When, for example the point 10e deflects laterally, that is, in the direction at right angles to the plane of the drawing, the spoke part 10b is twisted, whereby the part 10d acts as a crank. Due to the great length of the crank, large deflections are possible without twisting the spoke part 10b to an abnormal extent. Provided that the dimensions are suitably adopted, the flexibility of the wheel edge by the torsion of the spoke parts 10b, 11b, 12b, etc. will lead to a very economic elastic stressing of the material of the spokes, since nearly all the material of the twisted part is considerably stressed.

Under the influence of a lateral force acting upon the point or outer end of the tooth, the tooth 10f can be moved elastically out of the wheel plane, since the tooth is able to turn about the spoke part 10d, whereby this spoke part 10d is twisted. A similar movement of the tooth, without obtaining too rapidly a position at right angles to the wheel plane, which would be unfavourable for a good raking operation, may be obtained also when the rim 14 has already been moved out of the wheel plane by turning a spoke part 10d about a spoke part 10b, since during this movement the tooth 10f remains substantially parallel to the plane of the rim 13. Also in this case the wheel will have a good raking action. Moreover, when turning the tooth 10f about the spoke part 10d, the distance of the tooth point to the wheel hub decreases, since the supporting point 10c and the tooth 10f are on the same side of the radial plane passing through the wheel axis and the foot 10e, and the supporting point 10c is located at an appreciable distance from this radial plane. The above arrangement ensures that, independent of the individual deflections of the teeth, the rake wheel can be kept always with the greatest possible number of teeth points simultaneously or practically simultaneously in contact with the ground, so that a great workingwidth of the wheel will always be assured. For this reason, and by reason of the very supple flexibility both of the teeth themselves and of the outer rim 14, damage of the turf will be practically impossible and the risk of taking along earth, stones and the like during the raking action will be very small.

It will be understood that the expression "teeth extending outwardly from said rim at acute angles to tangents to said rim at the points of intersection of said teeth therewith," covers a rake wheel with a tooth, whose outer end makes an acute angle with the tangent to the rim at the point of intersection of the tooth with the rim.

It will further be understood that the word "rim" in the claims covers any means interconnecting the teeth which is located at a distance from the rake wheel hub.

What we claim is:

1. A rake wheel comprising a hub, a concentric wheel rim, a plurality of resilient, substantially equally spaced teeth extending outwardly from said rim at acute angles to tangents to said rim at the points of intersection of said teeth therewith, resilient spokes, equal in number to the said teeth, interconnecting said teeth with said hub, and means interengaging an inner point on each spoke between said hub and said rim to stabilize the said spokes of said wheel.

2. A rake wheel according to claim 1 in which said last named means comprises a second wheel rim supported solely by said spokes.

3. A rake wheel according to claim 1 in which said last named means comprises a second wheel rim, said resilient spokes including spoke parts extending between said wheel rims, each spoke part forming an angle with one of said teeth, the apex of the angle formed by each of said spoke parts and one of said teeth being located within said first named wheel rim.

4. A rake wheel according to claim 1 in which said last named means comprises a second wheel rim, said resilient spokes including spoke parts extending between said wheel rims, each spoke part forming an angle with the remaining portion of the spoke, the said remaining portion extending from said hub to said second wheel rim, the apex of the said angle being located within said second named wheel rim.

5. A rake wheel according to claim 1 in which said last named means comprises a second wheel rim, said resilient spokes including spoke parts extending between said wheel rims, each spoke part forming an angle with the remaining portion of the spoke, the said remaining portion extending from said hub to said second wheel rim, the apex of the said angle being located within said second named wheel rim, each spoke part forming an angle with one of said teeth, the apex of the angle formed by each of said spoke parts and one of said teeth being located within said first named wheel rim.

6. A rake wheel according to claim 1 in which said spokes each include a spoke part extending at a substantial right angle to its tooth.

7. A rake wheel according to claim 1 in which each of said spokes is integral with a tooth, the said wheel rim having a plurality of apertures, the points of connection between said spokes and said teeth being in said apertures.

8. A rake wheel comprising a hub, a concentric wheel rim, a plurality of resilient, substantially equally spaced teeth extending outwardly from said rim at acute angles to tangents to said rim at the points of intersection of said teeth therewith, resilient spokes, equal in number to the said teeth, interconnecting said teeth with said hub, and means inter-engaging an inner point on each spoke between said hub and said rim to stabilize the said spokes of said wheel, said last named means comprising a second wheel rim located between said first named wheel rim and said hub, said spokes extending substantially radially from said hub to said second wheel rim.

9. A rake wheel according to claim 8 in which said spokes are provided with spoke parts extending from said second wheel rim to said first named wheel rim, each spoke part extending at an angle from that portion of the spoke which extends radially from the hub to the second wheel rim.

10. A rake wheel according to claim 8 in which each wheel rim is provided with a plurality of apertures through which said spokes extend.

11. A rake wheel according to claim 10 in which each of the teeth and spokes form an angle with each other, the apex of said angle being located in the apertures of said first named wheel rim.

12. A rake wheel according to claim 1 in which alternate spokes each form a separate set of spokes, the roots of each set at the hub lying on opposite sides of a perpendicular plane extending from said rim to said hub.

13. A rake wheel according to claim 8 in which alternate spokes each form a separate set of spokes, the roots of each set at the hub lying on opposite sides of a perpendicular plane extending from said rim to said hub.

14. A rake wheel according to claim 8 in which said spokes are provided wth spoke parts extending from said second wheel rim to said first named wheel rim, each spoke part extending at an angle from that portion of the spoke which extends radially from the hub to the second wheel rim, the said spokes having hub-engaging means wherein alternate spoke-engaging means are spaced from each other longitudnially of said hub.

15. A rake wheel according to claim 8 in which each wheel rim is provided with a plurality of apertures through which said spokes extend, the said spokes having hub-engaging means wherein alternate spoke-engaging means are spaced from each other longitudinally of said hub.

16. A rake wheel according to claim 1, said spokes having spoke parts which extend at substantially right angles to said teeth.

17. A rake wheel according to claim 8, said spokes having spoke parts which extend at substantially right angles to said teeth.

18. A rake wheel according to claim 1, in which each spoke includes a spoke part that extends between said last named means and said wheel rim, said spoke part being located at an angle to the portion of the spoke located between said last named means and said hub, each of said teeth extending at a substantially right angle from its spoke part.

19. A rake wheel comprising a number of resilient teeth, a wheel rim interconnecting said teeth, said teeth extending outwardly from said rim at acute angles to tangents to said rim at the points of intersection of said teeth therewith, the teeth having extensions constituting resilient spokes extending inwardly from said rim, each of said teeth and its corresponding spoke being substantially located on the same side of the plane defined by the axis of rotation of said rake wheel and the point of intersection of each of said teeth with said rim.

20. A rake wheel according to claim 19, wherein each spoke extends at a substantial right angle to its tooth.

21. A rake wheel comprising a number of resilient teeth, an outer wheel rim interconnecting said teeth, said teeth extending outwardly from said outer rim at acute angles to tangents to said rim at the points of intersection of said teeth therewith, said teeth being hingeably connected to said outer rim extentions of said teeth constituting resilient spokes extending inwardly from said outer rim, an inner rim, each of said spokes being hingeably connected to said inner rim.

22. A rake wheel according to claim 21 wherein each extension is provided with a bent portion adjacent said inner rim.

References Cited in the file of this patent

UNITED STATES PATENTS

| | | |
|---|---|---|
| 2,330,910 | Ostman | Oct. 5, 1943 |
| 2,459,961 | Pollard | Jan. 25, 1949 |
| 2,603,053 | Lipe et al. | July 15, 1952 |
| 2,652,679 | Krause | Sept. 22, 1953 |

FOREIGN PATENTS

| | | |
|---|---|---|
| 674,797 | Great Britain | July 2, 1952 |

OTHER REFERENCES

Information Circular No. 4, Department of Agricultural Engineering, N. C. Agricultural Experiment Station, May 1951.